Feb. 7, 1939.  G. W. TURNBULL  2,146,387

DISPLAY DEVICE

Filed Dec. 3, 1936

INVENTOR.
George W. Turnbull
BY
ATTORNEY.

Patented Feb. 7, 1939

2,146,387

UNITED STATES PATENT OFFICE 2,146,387

DISPLAY DEVICE

George W. Turnbull, Detroit, Mich., assignor to Michigan Book Binding Company, Detroit, Mich., a copartnership Application December 3, 1936, Serial No. 113,992

7 Claims. (Cl. 281—33)

This invention relates to portfolios of the type used by salesmen and generally for advertising and display purposes and has for its object to provide an improved device of this type which will have a greater scope of utility.

Another object is to provide a tripod type of support having one wall hinged along its median line and hence collapsible between the other two walls in order that the support and its leaflets may be collapsed into a flat form for easy handling.

A further object is to provide a collapsible support as above described which will also include a stiff frame, as of comparatively heavy wire, which will be extensible to serve as a rack by which the leaves being displayed may be held in elevated position above and substantially in the plane of the leaf next in order. By this arrangement the reverse sides of one leaf may carry data, pictures or information of particular relevance to that on the front of the page next in order and when the first leaf is folded upwardly against the rack both pages appear simultaneously. This is of particular advantage where it is desired to contrast certain pictures, for instance.

Another object is to provide a rack as above described which may be retracted to an inconspicuous position when not in use, the legs thereof disappearing between the walls of the tripod with the top thereof lying immediately adjacent one of the walls whereby it will not add to the overall dimensions of the portfolio.

Other objects and advantages will become hereinafter more fully apparent as reference is had to the accompanying drawing and in which—

Figure 1:
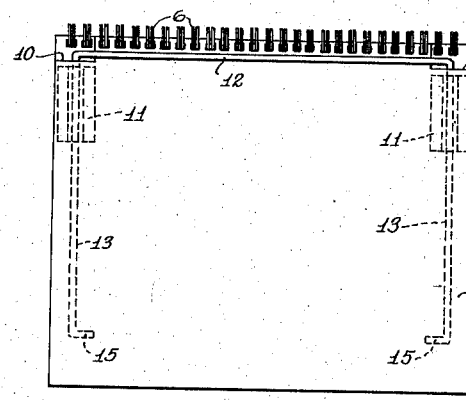
Figures 2, 3:
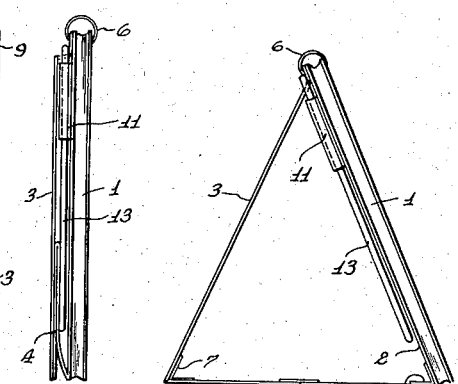
Figure 4:
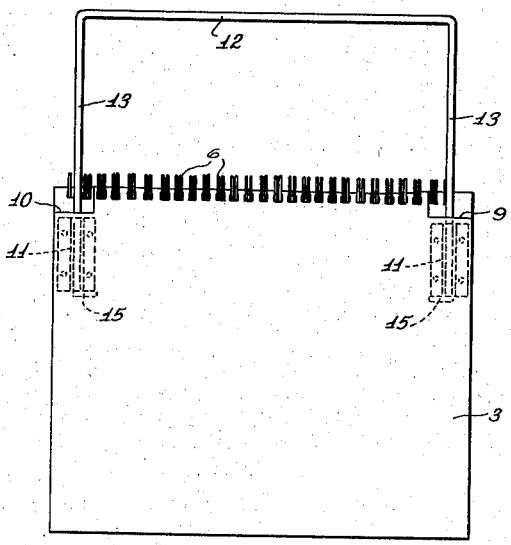
Figure 5:
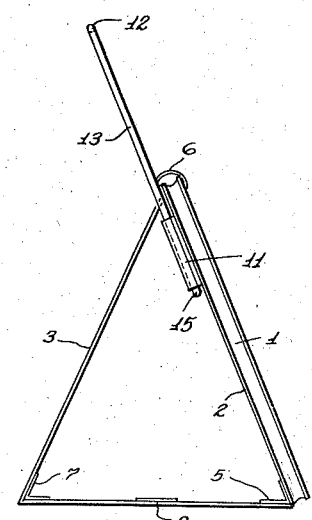
Figure 6:
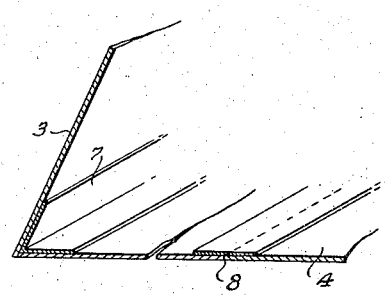
Figure 7:
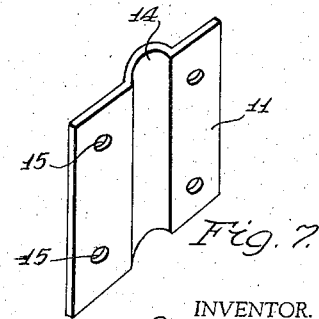

Fig. 1 is a rear view of the portfolio with the rack in retracted position,

Fig. 2 is a side elevation of the showing of Fig. 1 with the side walls collapsed against each other, Fig. 3 is a view similar to Fig. 2 with the side walls spread apart as permitted by the base, Fig. 4 is a view similar to Fig. 1 with the rack extended, Fig. 5 is a view similar to Fig. 3 with the rack extended, and Fig. 6 is a perspective detail of one corner of the triangular support, Fig. 7 is a perspective detail of the frame retainers with the leg of the frame therein.

More particularly, 1 indicates the leaves of a booklet which lie against a relatively stiff wall 2 of a triangular support composed of the side wall 2, another side wall 3 and a base wall 4. Each of the walls 2, 3 and 4 is hingedly connected at each edge thereof to the two adjacent walls as illustrated at 5, 6 and 7 respectively. The hinge 6 at the apex is preferably in the form of a loop wire device which serves not only as a hinge for the two walls 2 and 3 but also as the support for the pamphlet 1 which may therefore be of the loose leaf type.

The base wall 4 is hinged at 8 along its median line so that upon elevation of its hinge the walls 2 and 3 will collapse against each other as illustrated in Fig. 2. When the support is opened into the position best shown in Fig. 3 it is ready for use. The leaves may be swung upwardly from their lower edge and allowed to rotate about the hinge 6 to the wall 3.

The rear wall 3 is notched at 9 and 10 and immediately below each notch is a retainer 11 for a frame composed of a cross bar 12 and legs 13. The retainer has two wings joined by a trough portion 14, as best seen in Fig. 7, the wings being pierced at 15 for bolts or beads. The retainer is fixed to the wall 2, the trough 14 and the adjacent wall forming a guide for the legs 13. The lower ends of the legs 13 are bent at 15 so that they will not lose their position in the trough when the frame is drawn outwardly to the position illustrated in Figs. 4 and 5. When in this outward position the leaves of the pamphlet 1 come to rest thereagainst so that anyone viewing one side of the leaf in downward position can view the back of the leaf when it is swung upwardly against the frame. The subject matter on the back of the upward leaf can be viewed in conjunction with the subject matter of the front of the next succeeding leaf and consequently bring out supporting arguments for salesmen by contrasts, comparisons, etc.

When the frame is in retracted position the legs reside adjacent the wall 2 and the bar 12 nestles against the same wall 2 beneath the wire 6. The frame is thus inconspicuous when in retracted position and does not interfere in any way with the collapsing of the walls 2 and 3 against each other as shown in Fig. 2.

What I claim is:—

1. A portfolio comprising a leaflet, a triangular support for said leaflet, the leaves of said leaflet being hingedly mounted near one vertex of said support and resting against one wall thereof, and a frame having the legs thereof slidably mounted on one wall of said support for extension and retraction of the outer edge thereof with respect to the hinge of said leaves, said leaves being swingable through a vertical arc about said vertex to a position of rest against said frame when in extended position.

2. A portfolio comprising a leaflet, a triangular support for said leaflet, the leaves of said leaflet being hingedly mounted from the apex of said support and resting against one wall thereof, and a frame having the legs thereof slidably mounted on one wall of said support for extension and retraction of the outer edge thereof with respect to the hinge of said leaves whereby said leaves when turned find a position of rest against said frame when the legs are in extended position.

3. In a portfolio, a leaflet, a triangular support for said leaflet with the sides thereof hinged to adjacent sides, the base side of said support being hinged along a median line whereby upon elevation of said median line the other two sides collapse against each other, and a frame carried by said support having the legs thereof extensible from a retractible position between said other two sides, said frame when extended constituting a rest for the leaves of said leaflet when they are turned.

4. In a portfolio, a leaflet, a triangular support for said leaflet with the sides thereof hinged to adjacent sides, the base side thereof being hinged along a median line whereby upon elevation of said median line the other two sides collapse against each other, the hinge at the apex of said support being of a loop wire type and constituting also the means for hingedly supporting said leaflet, the leaves of said leaflet being adapted to turn about said apex and come to rest against the opposite side of the support, and a frame of bent wire having the legs thereof slidably mounted on one of the upright sides of the support on the inner side thereof with the crossbar thereof parallel with said apex, said frame when extended constituting a rest for said leaves when turned upwardly thereagainst.

5. A portfolio comprising a leaflet, a triangular support for said leaflet with the vertical sides thereof collapsible against each other, a loop wire hinge connecting the adjacent edge of said vertical sides and constituting also the support for said leaflet, said loop wire having an overall length substantially less than the length of the apex of said support, one of said vertical sides being notched on each side of said loop wire hinge, a bent wire frame having a cross bar outwardly of said support parallel to said apex with its legs projecting through said notches and between said vertical sides, and a retainer for said legs secured to the other side of said vertical sides immediately below said notches, said legs slidably engaging said retainers whereby said frame may be extended outwardly to constitute a position of rest for said leaves when they are turned upwardly.

6. A support for a leaflet comprising a stiff wall against one side of which the leaflet is intended to rest, and a frame having spaced legs connected by a rail piece, said legs being slidably mounted on the other side of said wall for extension and retraction of said rail piece away from and against an edge of said wall, said frame constituting a rest for the pages of the leaflet when turned from their position of rest against said wall.

7. A support for a leaflet comprising a stiff wall against one side of which the leaflet is intended to rest, means supporting said wall in substantially upright position, and a frame comprising leg means and a bar associated with said wall, said leg means being slidably mounted on the other side of said wall for retraction and extension of said bar toward and away from one edge of said wall, said bar and leg means serving as a support for leaves of said leaflet as they are turned from their position of rest against said wall.

GEORGE W. TURNBULL.